Patented Aug. 19, 1952

2,607,747

UNITED STATES PATENT OFFICE 2,607,747

METHOD OF MAKING CORK COMPOSITION HAVING A RUBBER BINDER WHICH INCLUDES COAGULATING A LATEX IN THE PRESENCE OF CORK PARTICLES AND MOLDING THE RESULTING MASS

Bruce R. Billmeyer, Lancaster, Pa., assignor to Armstrong Cork Company, Lancaster, Pa., a corporation of Pennsylvania No Drawing. Application March 18, 1947, Serial No. 735,549

6 Claims. (Cl. 260—17.4)

This invention relates to a method of making cork composition. More particularly, the invention relates to a method of making cork composition having a binder of rubber-like material in which method the binder is admixed with the cork particles in the form of an aqueous dispersion of binder, such as a rubber latex, and coagulated in the presence of the cork particles prior to molding or other shaping operations.

Cork compositions comprising cork particles and suitable binders have been widely used in various fields in the form of gaskets, liners for closures, insulation, shoe products, for examples, midsoles, and the like, and in other similar or related uses. A wide variety of materials have been suggested for use as binders for the granulated cork. However, many of these materials have certain disadvantages as they are unsuitable for use in the manufacture of certain specific products. For instance, in the manufacture of closure liners, certain binders which have been employed possess or impart a disagreeable odor to cork, thus rendering the composition undesirable for use in sealing containers for foods and beverages. Other materials which have been proposed as binders are undesirable from the point of view that they are permeable to liquids or gases, thus greatly reducing the efficiency of any product to be employed as a gasketing material where low permeability is desired. Several binders which have been proposed are affected by high temperatures, thus rendering the compositions containing them unsuitable for use in the manufacture of materials to be used in or near equipment operating at elevated temperature.

Rubber-like materials have been proposed as binders for cork composition as they possess certain characteristics which are highly desirable. Cork compositions containing rubber-like binders may be employed in the manufacture of closure liners, in the manufacture of gaskets, in the manufacture of shoe products, and in other fields in which cork compositions are widely utilized. Because of the characteristics of these rubber-like binders, none of the difficulties mentioned above is encountered. However, considerable difficulty has been experienced in the processing of cork composition prepared from granulated cork and rubber-like binders. One method of producing compositions from mixtures of cork particles is that involving the manufacture of the composition on conventional rubber equipment, such as a rubber mill. However, in addition to mixing difficulties, the action of the rubber mill substantially reduces the size of the cork particles. In order to overcome such difficulty, there have been proposals of admixing the cork particles with an aqueous dispersion of rubber-like binder, such as a rubber latex. In these methods involving the use of a rubber latex, it has heretofore been the practice to admix the cork particles and the latex, and thereafter mold the mixture under such conditions as to coagulate the latex in the mold. This procedure causes considerable difficulty in that the composition containing cork particles and uncoagulated latex is extremely difficult to handle. Due to the presence of uncoagulated latex in the composition, considerable quantities of binder are attached to parts of the equipment utilized in the molding operation.

While methods have been employed involving the use of natural or synthetic latices as binders for fibrous materials, in which methods the latices are at least partially coagulated prior to admixture with fibrous materials, such procedures are unsuitable for use in the manufacture of cork compositions in that coagulation before mixing results in a weak product. Cork compositions prepared from granulated cork and latices which have been coagulated before admixture with the cork, upon visual examination, show comparatively large rubber spots throughout the composition, thus indicating that precoagulated rubber is not uniformly distributed over the cork particles, thereby resulting in a product having comparatively weak portions which cause rapid failure in service.

It is, accordingly, an object of this invention to provide a method of making cork compositions characterized by highly desirable properties involving the use of rubber latex as a starting material.

It is a further object of this invention to provide a method of making cork composition involving admixing cork particles and rubber latex and forming an article of the desired shape without complications caused by the characteristics of the mixture during the forming operation.

Still another object of this invention is the provision of a relatively simple method of making cork composition from cork particles and rubber latex which is comparatively inexpensive and which may be carried out on commercially available equipment.

These and other objects of the invention will become apparent to those skilled in the art upon becoming familiar with the following description.

I have found that cork compositions having a rubber binder and characterized by high strength and tear resistance may be prepared by a method which includes compounding the rubber latex with vulcanizing agents and other ingredients which may vary depending upon the final properties desired, adding the resulting mixture to granulated cork, mixing the cork particles and compounded latex to obtain uniform distribution, coagulating the latex and molding the resulting mass of cork particles and coagulated latex to the desired shape.

The latices which may be employed in the practice of my invention may be a natural rubber latex, artificial dispersions of natural rubber, or may be the various synthetic rubber latices known to the art. Thus, latices of butadiene polymers, for example polybutadiene, copolymers of butadiene and styrene (known as GR-S and "Buna S"), and copolymers of butadiene and acrylonitrile (known as "Hycar," "Chemigum," and "Perbunan"), may be employed as binders. Other rubber-like materials which may be utilized include polymers obtained from substituted butadienes, such as chloroprene, a chlorinated butadiene. Chloroprene polymers are known to the art as "Neoprene."

Broadly speaking, therefore, the term "a rubber" or its equivalent, as used herein, is intended to include natural and synthetic rubber. By the term "synthetic rubber" is meant those synthetic substances which are commonly referred to as "synthetic rubbers" and which have physical properties resembling those of natural rubber, as set forth, for example, in the definition of "synthetic rubber" appearing at pages 3 to 4 of the Circular C427 of the United States Department of Commerce entitled "Synthetic Rubbers: A Review of Their Compositions, Properties, and Uses" by Lawrence A. Wood, issued June 25, 1940; and on page 9 of "Natural and Synthetic Rubbers," by Harry L. Fisher, being Edgar Marburg Lectures of 1941 presented before the Forty-Fourth Annual Meeting of the American Society for Testing Materials. Generally speaking, particularly advantageous results may be obtained in the practice of my invention by utilizing synthetic rubbers, such as butadiene-styrene copolymers, butadiene-acrylonitrile copolymers, and chloroprene polymers. A greater variety of physical properties may be obtained by the selective use of synthetic rubbers. For example, greater oil resistance may be obtained by the use of butadiene-acrylonitrile copolymers and chloroprene polymers.

The proportion of rubber solids and cork particles employed in the manufacture of cork composition in accordance with the method of my invention may be widely varied, depending, among other things, upon the particular products to be made. For instance, the proportions to be used in the manufacture of a gasket may vary somewhat from the proportions to be used in the manufacture of a shoe product. However, generally speaking, advantageous results may be obtained by employing at least 1 part of rubber solids to ½ part of cork particles to 1 part of rubber solids to 2 parts of cork particles. Particularly advantageous results may be obtained by utilizing approximately equal parts by weight of cork particles and rubber solids.

While the coagulation of the rubber latex may be accomplished by any means known to the art, I have found that advantageous results are obtained when the coagulation is brought about by the removal of substantially all of the water content of the mass prior to packing the mass into the mold. The removal of water from the mixture of latex and cork particles may be advantageously carried out by heating the mass to elevated temperature under subatmospheric pressures. After the desired quantity of water has been removed, the mass may then be transferred to the mold for the molding operation. Although the mass may be subjected to conditions sufficient to reduce the water content thereof to substantially zero, it is advantageous to retain a small proportion of water in the mass prior to the molding operation. This facilitates the handling of the mass during the molding operation. For instance, I have found that the moisture content of the mass is advantageously reduced to between about 6% and about 10% of the cork-rubber mixture. The presence of moisture in such quantities in the mass to be molded apparently has a beneficial plasticizing effect as it improves the cohesive and adhesive properties of the binder. In other words, the films of binder are more firmly attached to the cork and to each other resulting in a stronger product.

In one embodiment of my invention, the desired ingredients to be compounded with the latex, such as vulcanizing agents, plasticizers, accelerators, and the like, are dispersed in water and then added to a rubber latex, for example, a "Hycar" latex. The resulting compounded latex is then poured over cork particles in a suitable mixing device and agitated to obtain uniform distribution. The time required for obtaining uniform distribution of latex over the cork particles varies, depending, among other things, upon the size of the mixing device and the particular latex employed. However, generally speaking, in the practice of my invention, uniform distribution is obtained by agitation for a period of 5 minutes to 20 minutes. After mixing the compounded latex with the cork particles, the water is then removed from the resulting mixture under conditions such that approximately 6% to 10% by weight of moisture remains in the mass.

The removal of water from the cork-latex mass results in coagulation of the latex and gives a material which may be readily charged into the mold and molded to the desired shape without danger of the formation of deposits of uncoagulated latex on the mold parts. Ordinarily, the mass is packed in a mold of given dimensions under sufficient pressure to give a predetermined density.

If desired, a stabilizing agent may be incorporated in the latex, thus enabling mixing for considerable periods of time to obtain uniform distribution without coagulation of the latex. Examples of stabilizing agents which may be employed are "Darvan" (salts of polymerized alkyl aryl sulfonic acids), "Aquarex D" (sodium salt of the sulfate monoesters of a mixture of higher fatty alcohols consisting chiefly of the lauryl and myristyl derivatives), sodium lauryl sulfate, isopropyl naphthalene sodium sulfonate, and other materials which may be classified as surface active sulfates and surface active sulfonates. Other stabilizing agents which may be used are casein, glue, bentonite, soap, and the like.

This embodiment of my invention may be more readily understood by reference to the following specific examples in which all parts are given by weight.

*Example I*

A compounded "Neoprene" latex was prepared from the following ingredients in the following proportions:

|  | Dry |
|---|---|
| "Neoprene" latex (50% solids) _____parts__ | 100 |
| "Neozone D" (phenyl beta naphthyl amine) _____do____ | 2 |
| Lithopone (ZnS 30%, BaSO₄ 70%) ___do____ | 10 |
| Zinc oxide _____do____ | 3 |
| Sulfur _____do____ | 2 |

This compounded latex was then poured over 100 parts of 14 to 20 mesh cork particles and mixed until uniform distribution was obtained. The resulting mixture was heated under 10 pounds vacuum until the moisture content thereof was about 12%, and the latex was coagulated. A sheet 6⅛"x6⅛"x¼" was molded by packing the mass in a mold under sufficient pressure to give a product having a density of 45 pounds per cubic foot and subjecting the mass to a temperature of 315° F. for 25 minutes. The resulting product exhibited good hardness, and tensile strength, and had no surface defects.

*Example II*

A compounded latex was formed from the following ingredients in the following proportions:

|  | Dry |
|---|---|
| "Hycar O. R." latex (40% solids)__parts__ | 100 |
| Sulfur _____do____ | 1.5 |
| "Neozone D" (phenyl beta naphthyl amine) _____do____ | 2.0 |
| Stearic acid_____do____ | 1.0 |
| Clay _____do____ | 50.0 |
| "Altax" (benzothiazyl disulfide)_____do____ | 1.25 |
| Diphenyl guanidine_____do____ | .25 |

The resulting compounded latex was poured over 125 parts of 14 to 20 mesh cork particles and heated at subatmospheric pressure to remove water until the moisture content was 6% and the latex was coagulated. This mass was then packed into a mold under pressure sufficient to give a density of 44 pounds per cubic foot and a sheet characterized by good hardness which exhibited no surface defects was obtained after molding at 325° F. for 25 minutes.

If desired, plasticizing agents may be incorporated in the compounded latex to increase the plasticity of the rubber. For instance, various plasticizers commonly employed in the plasticizing of rubber may be employed, such as light mineral oil, dibutyl phthalate, dipolymer oil, low melting point coumarone-indene resins, and the like.

Typical of compositions containing plasticizing agents is the following specific example.

*Example III*

|  | Dry |
|---|---|
| "Neoprene" latex (50% solids) _____parts__ | 100 |
| Suprex clay_____do____ | 20 |
| Zinc oxide_____do____ | 5 |
| "Neozone D" (phenyl beta naphthyl amine) _____do____ | 2 |
| Light mineral oil_____do____ | 20 |
| 20-40 mesh cork particles_____do____ | 100 |

In a particularly advantageous embodiment of my invention, the compounded latex is formed and then poured over cork particles with agitation to effect uniform distribution of the latex over the particles. The water content is reduced to the desired percentage which is advantageously 6% to 10%, and a solvent is added to the resulting mass to soften the rubber solids. The quantity of solvent added is subject to variation. The larger the quantity added, the better the properties of the final product from the point of view of elongation and tensile strength. However, since the solvent is advantageously removed in the shaping operation, the quantity added should be such as to enable removal of solvent or at least a reduction in solvent content of the mass without unduly prolonging the time of the mass in the mold. Generally speaking, advantageous results may be obtained by the incorporation of about 5% to 20% by weight of solvent in the cork-coagulated rubber mixture. While a wide variety of solvents may be employed, such as alkyl esters of carboxylic acids, for example, butyl acetate, ketones, for example, acetone, and hydrocarbon solvents, such as aromatic hydrocarbons for example, benzene, toluene, xylene, and the like, particularly advantageous results have been obtained with toluene in that this material exhibits a marked softening effect upon the rubber which causes better knitting of the rubber and cork and yet does not impart any undesirable characteristics to the molded cork composition. The following examples illustrate the embodiment of my invention involving the addition of solvent prior to charging the material into a mold.

*Example IV*

A compounded latex was formed from the following ingredients in the following proportions:

|  | Dry |
|---|---|
| "Neoprene" latex (50% solids)_____parts__ | 334 |
| Low melting point coumarone-indene resin _____do____ | 113 |
| Casein 10%_____do____ | 134 |
| Glycerine _____do____ | 13 |
| Light mineral oil_____do____ | 24 |
| Tetraethyl thiuram disulfide_____do____ | 22 |
| Piperidinium pentamethylene-dithiocarbamate _____do____ | 17 |

This compounded latex was then poured over 334 parts of 20 to 40 mesh cork particles and agitated until uniform distribution was obtained. Following the agitation, the mass was heated to reduce the water content to about 6%. Thereafter, 10% by weight of butyl acetate was added to the mass, and the resulting mixture was maintained in a closed container for 3 hours. After removal from the container, the mass was molded for 15 hours at a temperature of 230° F. to 250° F. About 15% of the solvent was lost during the molding operation.

*Example V*

To the same mixture of compounded latex and cork particles treated as in Example IV, was added 10% by weight of a hydrocarbon known as "Solvesso #1." The mass was maintained in a closed container for 3 hours and then molded by subjecting the mass to a temperature of 230° F. to 250° F. for 15 hours. The resulting product exhibited an elongation of 50% and a tensile strength of 316 pounds per square inch.

Example VI

To a mass compounded and treated as in Example IV, was added 20% by weight of toluene. The resulting mass was maintained in a closed container for 3 hours and then molded at a temperature of 230° F. to 240° F for 15 hours. The resulting material exhibited 60% elongation and a tensile strength of 425 pounds per square inch.

The characteristics of the products prepared in accordance with my invention may be varied by altering the proportions of the various ingredients of the compounded latex, such as the plasticizers, accelerators, and the like. Likewise, changes may be made in the characteristics of the final product by varying the size of the cork particles employed. Also, the conditions of packing have an effect upon the characteristics of the final product. For instance, where a material to be utilized as a gasket is desired, it is advantageous to closely pack the composition in the mold, thus resulting in a high density product of low permeability. On the other hand, when the material is to be utilized as a shoe product, where flexibility is highly desired, this can be obtained by the use of comparatively large cork particles and by packing the rubber-cork mixture loosely in the mold. Generally speaking, the process is advantageously carried out with cork particles ranging from 5–10 mesh to 30–50 mesh.

Although the manufacture of cork composition in accordance with my invention is advantageously accomplished by molding the cork-rubber mass, if desired, the mass may be subjected to vulcanizing conditions and thereafter cut to the desired shape.

While my invention has been described with reference to certain particular embodiments and with reference to certain specific examples, it is to be understood that the invention is not limited thereby. Therefore, changes, omissions, subsitutions, and/or additions may be made without departing from the spirit of the invention as defined in the appended claims which are intended to be limited only as required by the prior art.

I claim:

1. A method of making cork composition comprising forming a mixture of a vulcanizing agent, a synthetic rubber latex of the group consisting of butadiene-styrene copolymer latex, butadiene-acrylonitrile copolymer latex, and chloroprene polymer latex, and cork particles, said mixture containing ½ to 2 parts by weight of cork particles per one part by weight of synthetic rubber solids, reducing the water content of said mixture to about 6% to 10% by weight, charging the resulting mass to a mold, and molding said mass at a temperature of about 230° F. to about 315° F.

2. A method of making cork composition comprising forming a mixture of a vulcanizing agent, a butadiene-acrylonitrile copolymer latex, and cork particles, said mixture containing ½ to 2 parts by weight of cork particles per 1 part by weight of copolymer solids, reducing the water content of said mixture to about 6% to 10% by weight, charging the resulting mass to a mold, and molding said mass at a temperature of about 230° F. to about 315° F.

3. A method of making cork composition comprising forming a mixture of a vulcanizing agent, a chloroprene polymer latex, and cork particles, said mixture containing ½ to 2 parts by weight of cork particles per 1 part by weight of polymer solids, reducing the water content of said mixture to about 6% to 10% by weight, charging the resulting mass to a mold, and molding said mass at a temperature of about 230° F. to about 315° F.

4. A method of making cork composition comprising forming a mixture of a vulcanizing agent, a synthetic rubber latex of the group consisting of butadiene-styrene copolymer latex, butadiene-acrylonitrile copolymer latex, and chloroprene polymer latex, and cork particles, said mixture containing ½ to 2 parts by weight of cork particles per 1 part by weight of synthetic rubber solids, reducing the water content of said mixture to about 6% to 10% by weight, adding to said mixture about 5% to 20% by weight thereof of a solvent having a softening effect on the synthetic rubber and selected from the group consisting of butyl acetate, acetone, benzene, toluene, and xylene, charging the resulting mass to a mold, and molding said mass at a temperature of about 230° F. to 250° F.

5. A method of making cork composition comprising forming a mixture of a vulcanizing agent, a butadiene-acrylonitrile copolymer latex, and cork particles, said mixture containing ½ to 2 parts by weight of cork particles per 1 part by weight of copolymer solids, reducing the water content of said mixture to about 6% to 10% by weight, adding to said mixture about 5% to 20% by weight thereof of a solvent having a softening effect on the copolymer and selected from the group consisting of butyl acetate, acetone, benzene, toluene, and xylene, charging the resulting mass to a mold, and molding said mass at a temperature of about 230° F. to 250° F.

6. A method of making cork composition comprising forming a mixture of a vulcanizing agent, a chloroprene polymer latex, and cork particles, said mixture containing ½ to 2 parts by weight of cork particles per 1 part by weight of polymer solids, reducing the water content of said mixture to about 6% to 10% by weight, adding to said mixture about 5% to 20% by weight thereof of a solvent having a softening effect on the polymer and selected from the group consisting of butyl acetate, acetone, benzene, toluene, and xylene, charging the resulting mass to a mold, and molding said mass at a temperature of about 230° F. to 250° F.

BRUCE R. BILLMEYER.

REFERENCES CITED

The following references are of record in the file of this patent:

UNITED STATES PATENTS

| Number | Name | Date |
| --- | --- | --- |
| 774,645 | Brooks | Nov. 8, 1904 |
| 1,567,506 | Hopkinson | Dec. 29, 1925 |
| 1,591,018 | Cutler | July 6, 1926 |
| 2,155,429 | Levin | Apr. 25, 1939 |
| 2,196,407 | Alkinson | Apr. 9, 1940 |
| 2,279,450 | Diehl | Apr. 14, 1942 |
| 2,491,715 | Clayton | Dec. 20, 1949 |